Figure 1:
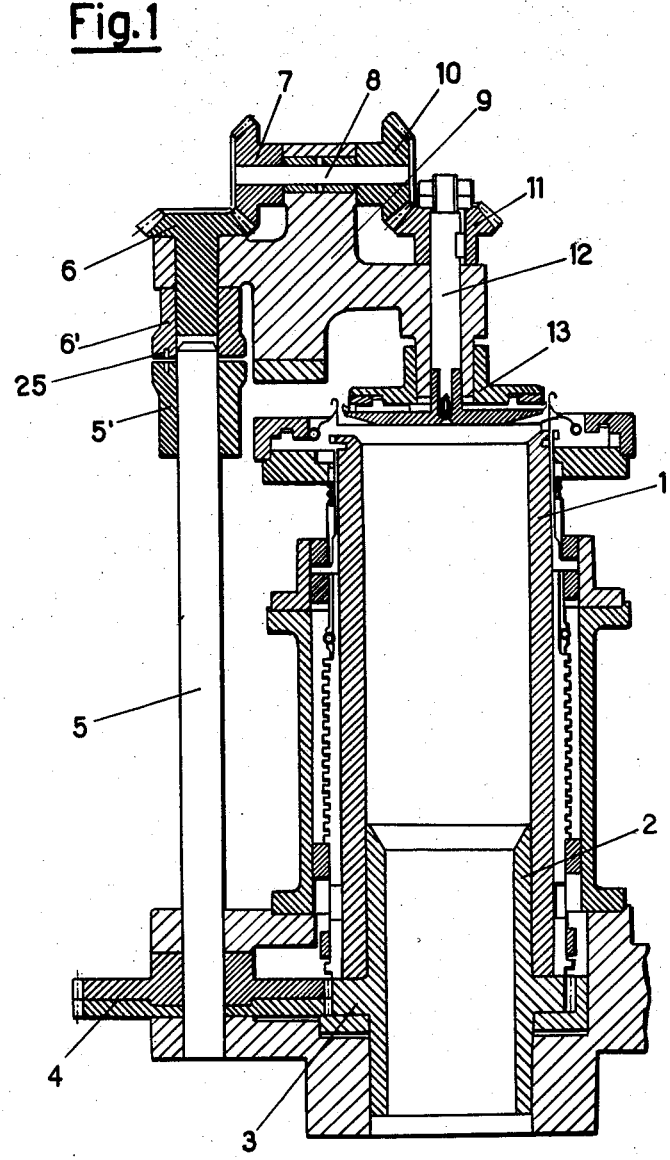

July 22, 1958

G. MORETTA 2,844,014

DRIVE TRANSMISSION IN CIRCULAR HOSIERY AND KNITTING
MACHINES WITH COMPENSATION OF THE WEAR
IN THE GEAR TEETH

Filed Aug. 10, 1954

3 Sheets-Sheet 1

INVENTOR.
Giuseppe Moretta
BY
ATTY.

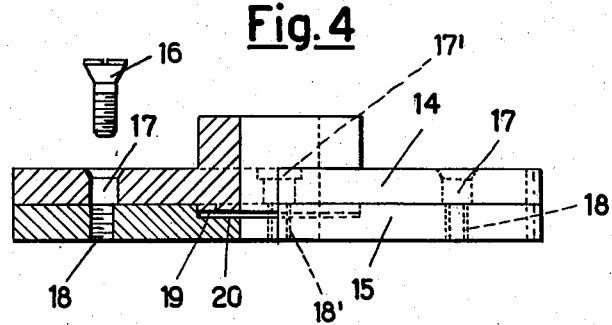
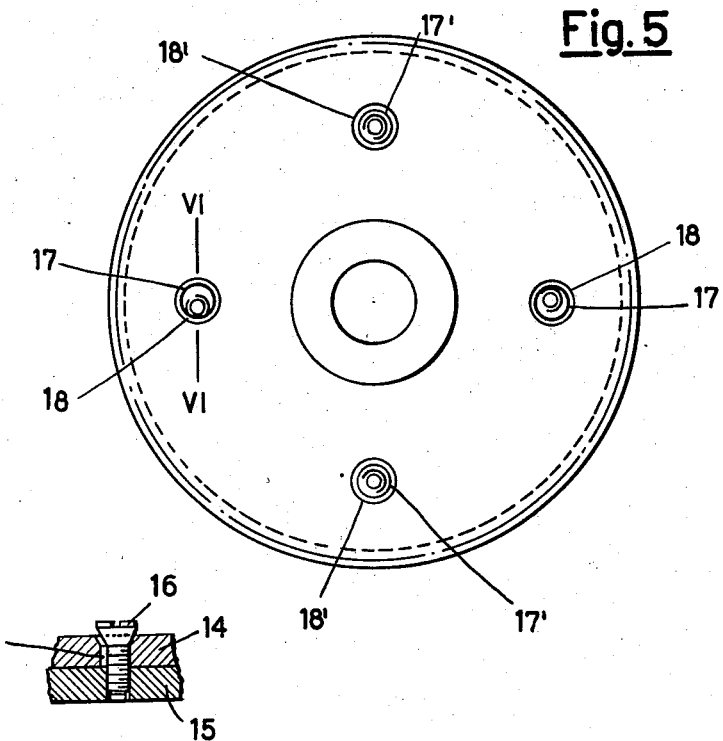

United States Patent Office 2,844,014
Patented July 22, 1958

2,844,014

DRIVE TRANSMISSION IN CIRCULAR HOSIERY AND KNITTING MACHINES WITH COMPENSATION OF THE WEAR IN THE GEAR TEETH

Giuseppe Moretta, Varese, Italy

Application August 10, 1954, Serial No. 448,843

Claims priority, application Italy April 7, 1954

2 Claims. (Cl. 66—28)

This invention concerns the drive from the central cylinder to the instrument head in circular hosiery and knitting machines, in which a gear wheel fixed to the cylinder is driven by the driving shaft and transmits the drive to a vertical shaft, which is disposed to one side of the cylinder and is coupled, by a series of gears in the instrument head, to a vertical shaft carrying the instrument disc and mounted concentrically with the cylinder.

In the circular machine known in the art, this transmission consists of simple bevel gearing, the drive being transmitted from the driving shaft to a vertical shaft placed beside the cylinder, from the vertical shaft to a horizontal shaft in the instrument head, and finally from here to the vertical shaft carrying the instrument disc concentrically with the cylinder. The needle cylinder and the instrument disc should rotate in perfect synchronism, but in the machines available at the present time, this condition is only fulfilled for a relatively limited period because the bevel gears on the ends of the said shafts are subject to rapid wear, resulting in the appearance of backlash and consequent loss of synchronism. The rate of wear is particularly pronounced in those types of machine in which the vertical shaft beside the cylinder and the horizontal shaft in the instrument head rotate at four times and twice the angular velocity, respectively, of the synchronous needle cylinder and instrument head; the corresponding reduction ratios obtained in the bevel gearing at their extremities results in increased wear of the gears.

The object of this invention is to obviate the serious disadvantage of the loss of synchronism to which the circular machines now in use are liable, by providing means of compensating the backlash resulting from the wear of the gears in such a manner as to appreciably prolong the time for which perfect synchronism is maintained and the efficient functioning of the machine.

The transmission which embodies this invention is characterised by the fact that it includes at least one adjustable cylindrical gear wheel consisting of two coaxial gear wheels fixed face to face, and whose angular position with respect to each other can be varied and fixed in such a manner as to obtain an effective overall tooth width which takes up the backlash due to wear, thus maintaining the synchronism between the various elements of the transmission.

Furthermore, in order to assure that all the gears work under the same conditions of stress and wear, a reduction ratio of 1:1 is adopted between the various gears according to the invention, so that all the shafts of the transmission revolve at the same angular velocity and the rate of wear is reduced.

The accompanying drawings illustrate, without thereby limiting the scope of the invention, two embodiments of the invention.

Figure 2:
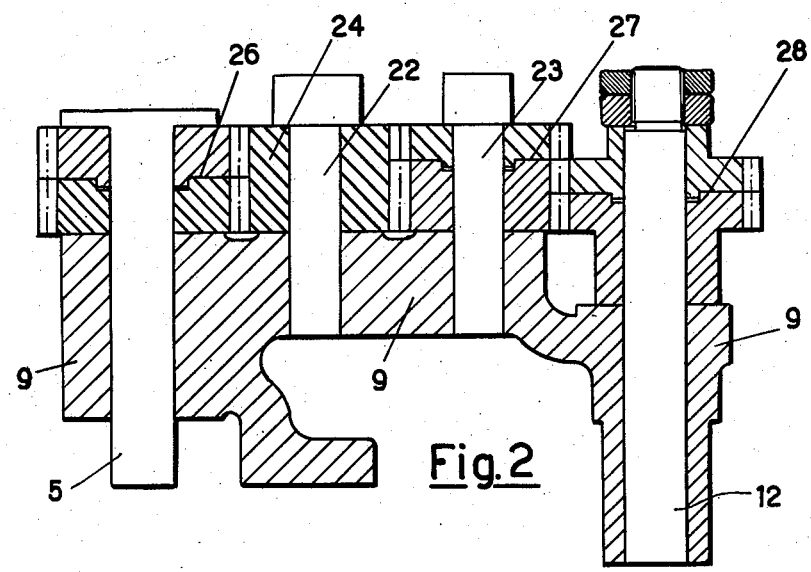
Figure 3:
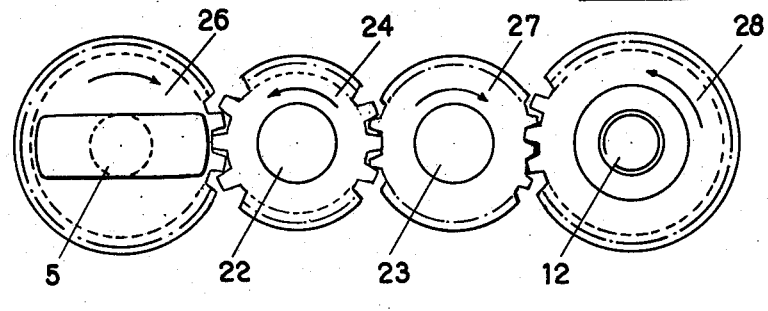

In the figures of drawings:

Fig. 1 is an elevation showing a section through part of a knitting machine and illustrating the various elements of a transmission in accordance with one embodiment of this invention, Fig. 2 is an elevation showing a section through a transmission in the instrument head of the machine constructed in accordance with another embodiment of the invention, Fig. 3 is a plan view corresponding to Fig. 2, Fig. 4 is an elevational view, partly broken away and in section, of an adjustable cylindrical gear wheel according to the invention, Fig. 5 is a plan view of the gear wheel shown in Fig. 4, Fig. 6 is a fragmentay sectional view taken along the line VI—VI in Fig. 5.

Fig. 1 represents part of a knitting machine, showing the needle cylinder 1 mounted on the drum 2 to which is rigidly attached the cylindrical gear 3, the latter being driven by the driving shaft through a gear not shown in the drawing. A gear 4 is mounted on the lower end of a vertical shaft 5, which is supported in bearings to one side of the machine and provided at its upper end with a coupling hub 5' designed to engage with a similar hub 6' by means of the pin 25. The coupling hub 6' is rigidly attached to the bevel gear 6, which engages with the bevel gear 7 on one end of the horizontal shaft 8. This shaft is supported in a bearing in the instrument head 9 of the machine, and carries at its other end a bevel gear 10 held in engagement with the bevel gear 11 which is mounted on the upper end of the vertical shaft 12, the latter being supported in a bearing in the instrument head 9 of the machine and carrying the instrument disc or dial 13 which is to be driven round in perfect synchronism with the needle cylinder 1. All the other parts of the machine do not differ essentially from those already in use and will therefore not be described.

This arrangement results in an even distribution of the wear over the various gears and facilitates removal of the instrument head, as will be described subsequently.

The adjustable cylindrical gear 4 is illustrated in detail in Figs. 4, 5 and 6. It consists of two coaxial gear wheels 14 and 15 fastened together face to face by means of the screws 16, which pass with clearance through the smooth, counter-sunk holes 17 in the wheel 14 and are screwed into the tapped holes 18 in the wheel 15. The wheel 14 is provided with a cylindrical projection 19 which fits into a corresponding cylindrical cavity 20 in the wheel 15. Two cheese-headed screws pass with clearance through two smooth, counter-bored holes 17' in the wheel 14 and are screwed into the tapped holes 18' in the wheel 15.

Whereas the screws 16 are provided with countersunk heads, the other two screws extending through the holes 17' have cylindrical heads; in fact, the screws 16, whose conical heads engage wtih the inclined walls of the counter-sunk portions of holes 17, thereby determine the relative angular position of the two wheels with respect to each other according to how far they are screwed in, while the cheese-headed screws only serve to fix the two wheels together in the desired relative angular position. The relative displacement of the two wheels 14 and 15 results in an effective variation of the width of the teeth formed by the superposition of the two sets of teeth, and this variation can be effected in such a manner as to compensate exactly the backlash resulting from the wear experienced by the gear teeth in the normal running of the machine.

In the arrangement shown in Fig. 1, only one such adjustable gear has been employed, namely that at the lower end of the vertical shaft 5.

It is naturally advisable to introduce more of such adjustable gears in such a manner as to be able to compensate the backlash between every mating gear pair in the course of the transmission.

The adoption of a reduction ratio of 1:1 throughout the transmission has the advantage, not only of reducing the rate of wear and consequent formation of backlash, but also of facilitating the removal and replacement of the instrument head inasmuch as it is then no longer necessary to ensure that the teeth of the gears engage in the correct phase relationship. Thus in the case illustrated in Fig. 1, the instrument head can be made to oscillate about a pivot, which is not shown in the drawing, so as to free the coupling hub 6′ from engagement with the pin 25 in the coupling hub 5′. When the instrument head is brought back to its operating position, all that need be done is to re-engage this coupling, since the relation between the coupling elements 5—5′ and 6—6′ of the transmission is definite.

Figs. 2 and 3 illustrate an arrangement which permits the use of three adjustable gears in the instrument head, the transmission being effected by a gear train mounted on vertical shafts only. The shafts 5, 22, 23 and 12 all rotate at the same angular velocity, resulting in minimum wear, which is in turn completely compensated by the adjustable gears 26, 27 and 28.

In fact, the adjustable gear 26 eliminates backlash in the coupling between shafts 5 and 22, the adjustable gear 27 that between shafts 22 and 23 (it is consequently unnecessary for the gear 24 to be adjustable), and the adjustable gear 28 that between shafts 23 and 12 (the adjustable gear wheel 28 engages only with the lower wheel of the adjustable gear wheel 27).

The adjustable gears 26, 27 and 28 are constructed in much the same way as the adjustable gear wheel 4 in Fig. 1, the essentials of that construction being illustrated by way of example in Figs. 4, 5 and 6.

The application of the invention illustrated in Figs. 2 and 3 offers the advantage of a very rational and precise compensation. The arrangement of the gear train in the instrument head of the machine illustrated in Figs. 2 and 3 can be used by itself, or in conjunction with the adjustable gear wheel 4 engaging with the gear fixed to the drum as illustrated in Fig. 1.

The introduction of even a single adjustable gear in the transmission allows the maintenance of synchronism between the instrument disc and the needle drum in the machine under consideration to be appreciably prolonged.

I claim:
1. In a circular hosiery and knitting machine having a vertical central cylinder carried by a drum which is rigidly attached to a gear wheel rotated by a driving shaft, and an instrument head movable vertically with respect to said cylinder and rotatably carrying a vertical shaft concentric with said cylinder and on which is mounted an instrument disc; transmission means for transferring the drive from the central cylinder to the shaft of the instrument disc and comprising a vertical shaft at one side of the central cylinder and having gear means thereon meshing with the gear wheel attached to the drum, said gear means and the gear wheel having a 1:1 ratio so that said shaft at one side of the cylinder is rotated at the same angular speed as the cylinder, a gear train carried by the instrument head and comprising a succession of meshing gears including an input gear axially aligned with said shaft at one side of the cylinder and an output gear fixed on the shaft carrying the instrument disc, said succession of meshing gears all having 1:1 ratios, and vertically separable coupling means including a first coupling element fixed on said shaft at one side of the cylinder and a second coupling element fixed with respect to said input gear of the gear train and meshing with said first element in only one angular position relative to the latter so that the phase relation between the central cylinder and the instrument disc is fixed and automatically reestablished by meshing of said coupling elements.

2. In a circular hosiery and knitting machine, transmission means according to claim 1; wherein said coupling elements are in the form of axially abutting hubs, one of said hubs having a single axially opening recess and the other of said hubs having an axial projection received in said recess when the instrument disc is in phase with the central cylinder to transmit the rotation of said shaft at one side of the cylinder to said input gear of the gear train.

References Cited in the file of this patent
UNITED STATES PATENTS

| | | |
|---|---|---|
| 1,722,889 | Bentley | July 30, 1929 |
| 2,040,021 | Paquette | May 5, 1936 |